United States Patent
Ko et al.

(10) Patent No.: US 7,238,324 B2
(45) Date of Patent: Jul. 3, 2007

(54) MICROFLUIDIC DEVICE FOR THE CONTROLLED MOVEMENT OF FLUID

(75) Inventors: Jong Soo Ko, Daejeon (KR); Hyun Chul Yoon, Seoul (KR); Hae Sik Yang, Daejeon (KR); Dae-Sik Lee, Daejeon (KR); Kwang Hyo Chung, Busan (KR); Hyeon Bong Pyo, Daejeon (KR); Sung Jin Kim, Daejeon (KR); Yun Tae Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 165 days.

(21) Appl. No.: 10/615,441

(22) Filed: Jul. 7, 2003

(65) Prior Publication Data

US 2004/0028566 A1  Feb. 12, 2004

(30) Foreign Application Priority Data

Aug. 8, 2002 (KR) .................. 10-2002-0046794

(51) Int. Cl.
B01L 3/02 (2006.01)
(52) U.S. Cl. ...................... 422/100; 436/174
(58) Field of Classification Search ............... 422/100, 422/68.1; 436/174
See application file for complete search history.

(56) References Cited

U.S. PATENT DOCUMENTS

| | | | |
|---|---|---|---|
| 5,992,820 A | 11/1999 | Fare et al. | |
| 6,113,855 A | 9/2000 | Buechler | |
| 6,271,040 B1 | 8/2001 | Buechler | |
| 6,468,761 B2* | 10/2002 | Yang et al. | 435/23 |
| 6,632,400 B1* | 10/2003 | Brennen et al. | 422/82.01 |
| 6,827,906 B1* | 12/2004 | Bjornson et al. | 422/101 |
| 2002/0150683 A1* | 10/2002 | Troian et al. | 427/256 |
| 2003/0070677 A1* | 4/2003 | Handique et al. | 128/203.12 |
| 2003/0075101 A1* | 4/2003 | Weigl et al. | 117/200 |
| 2003/0190608 A1* | 10/2003 | Blackburn | 435/6 |
| 2004/0007275 A1* | 1/2004 | Hui Liu et al. | 137/828 |

OTHER PUBLICATIONS

"A Polymer-based microfluidic device for immunosensing biochips", J. Ko, et al., Lab Chip 2003, 106-113.

* cited by examiner

*Primary Examiner*—Jill Warden
*Assistant Examiner*—Natalia Levkovich
(74) *Attorney, Agent, or Firm*—Blakely Sokoloff Taylor & Zafman

(57) ABSTRACT

A microfluidic device for controlling the flow of a micro amount of fluid is provided. The microfluidic device is manufactured by binding a sensing substrate including a sensing electrode, an electrode interconnect, and a electrode pad, with a channel substrate including at least two fluid inlet ports, a chamber, and a channel, wherein a first fluid injected via one of the fluid inlet ports flows by natural capillary force, and a second fluid injected via another fluid inlet port is forced to flow by an external pump. The microfluidic device controls fluid flow and flow stoppage by a combination of natural capillary flow and an externally applied pressure as a result of the action of a pump.

10 Claims, 12 Drawing Sheets

MICROFLUIDIC DEVICE FOR THE CONTROLLED MOVEMENT OF FLUID

BACKGROUND OF THE INVENTION

This application claims priority from Korean Patent Application No. 2002-46794, filed on Aug. 8, 2002, in the Korean Intellectual Property Office, the disclosure of which is incorporated herein in its entirety by reference.

1. Field of the Invention

The present invention relates to a microfluidic device for use in a biochip, and more particularly, to a microfluidic device that controls fluid flow by using the combination of a natural capillary force and an externally applied pressure generated by pumping.

2. Description of the Related Art

Microfluidic devices known as the most crucial element of biochips can be implemented based on various kinetics principles. For example, a microactuating method using a micro pump and a micro valve, which are connected to a micro channel or chamber, an electrophoretic method of inducing fluid flow by applying a voltage across a micro channel, a capillary flow method using capillary force, and other methods can be applied to accomplish microfluidic devices.

Various kinds of microfluidic devices manufactured based on such operating principles include active microfluidic components, such as micro pumps and micro valves, that directly control fluid flow, flow stoppage, or flow rate, and passive microfluidic components, such as channels or chambers, that affect fluid flow, flow stoppage, or flow rate through their topology or shape changes. These microfluidic devices have a wide range of applications, for example, in protein chips, DNA chips, drug delivery systems, and micro biological/chemical reactors, which require precise and accurate flow controls.

Among various microfluidic devices, ones using capillary flow control fluid flow, flow stoppage, and flow rate using an attractive force or repulsive force generated spontaneously due to the surface tension exerted between the inner surface of a micro tube and fluid. Most capillary microfluidic devices do not include an active driver, so they do not require an additional power supply and hardly cause problems. However, high performance biochips cannot be implemented exclusively using capillary flow in some applications. For example, a biochip using an electrochemical detection method requires the washing away of floating, unbound small particles or colloids, or reaction products loosely bound to a sensing electrode after biochemical reactions of a sample on the sensing electrode and buffer exchange for electrochemical detection. This buffer exchange process requires forced fluid flow by an external force.

Typical examples of capillary microfluidic devices are disclosed in U.S. Pat. Nos. 6,271,040 and 6,113,855. U.S. Pat. No. 6,271,040 suggests a diagnostic biochip having a structure where a fluid sample is delivered by only capillary force for a reaction in a chamber and a channel, and an optical method is applied to detect the reaction of the sample and reagents. U.S. Pat. No. 6,113,855 suggests capillarity-inducing hexagonal structures appropriately arranged in a chamber to induce capillary force.

Most capillarity-based biochips known thus far are limited to optical detection and do not require a microfluidic control device having a buffer exchange structure. The above-described U.S. patents also teach only devices and methods for controlling fluid flow or flow stoppage by changing a channel structure. However, in biochips using electrochemical detection, which require buffer exchange as described above, there is a need to forcedly control fluid flow by applying an external force in order to fully wash away unnecessary substances and to exchange buffer solutions in a chamber, which cannot be achieved through common capillary flow.

SUMMARY OF THE INVENTION

The present invention provides a microfluidic device enabling full fluid exchange and the effective washing away of unnecessary substances in a chamber of an analytic chip.

In accordance with an aspect of the present invention, there is provided a microfluidic device that controls fluid flow and flow stoppage of a micro fluid by using the combination of a natural capillary force and an externally applied pressure generated using a pump and control the flow rate of fluid through channel geometry changes or surface modifications. According to the present invention, fluids, for example, a sample and buffer solution are flowed by capillarity and an externally applied force, respectively. Different kinds of fluids are injected and flow in multiple directions. The reaction products are washed through forced flow by an external force. The flow rate of fluid in the microfluidic device can be controlled by appropriately selecting hydrophobic and hydrophilic materials to form capillaries of the device.

In particular, a microfluidic device according to the present invention is manufactured by binding a sensing substrate including a sensing electrode, an electrode interconnect, and a electrode pad, with a channel substrate including at least two fluid inlet ports, a chamber, and a channel. A first fluid injected via one of the fluid inlet ports flows by natural capillary force, and a second fluid injected via another fluid inlet port is forced to flow by an external pump.

The first fluid flows along a predetermined channel up to a site of designation by capillary force, and the second fluid is forced to push out the first fluid that stays at the site of designation for fluid exchange. The first fluid may be injected as a sample after the immobilization of biological/chemical substances on the sensing electrode, and the reaction product between the first fluid and the biological/chemical substance may be electrochemically detected.

According to the present invention, by the combination of natural capillary flow and forced flow induced by an external pump, fluid flow and flow stoppage of a micro fluid can be controlled, and full fluid exchange and the effective washing away of unnecessary substances in a chamber can be achieved.

The sensing substrate and the channel substrate may be formed of heterogeneous materials, such as hydrophobic and hydrophilic materials, or may be formed of homogeneous materials, such as hydrophobic or hydrophilic materials, but with different degrees of hydrophobicity or hydrophilicity. In either case, an additional hydrophobic or hydrophilic material pattern having opposite properties to the material composing the body of the substrate or with a different degree of hydrophilicity or hydrophobicity thereto may be additionally applied to a limited region of the sensing substrate or the channel substrate. Through such channel geometry changes or surface modifications, the flow rate of fluid can be controlled.

Another microfluidic device according to the present invention is manufactured by binding a sensing substrate including a sensing electrode, an electrode interconnect, and an electrode pad, with a channel substrate including a first fluid inlet port at a side of the channel substrate, a first fluid addition chamber around the first fluid inlet port, a sample reaction barrier, a sensing chamber, a second fluid inlet port at the other side of the channel substrate, a second fluid addition chamber around the second fluid inlet port, a channel connecting the second fluid addition chamber and the sensing chamber, and a used reagent reservoir connected to the sensing chamber. This microfluidic device may further comprise a reaction chamber and a time delay between the sample reaction barrier and the sensing chamber. A sample injected via the first fluid inlet port flows into the sensing chamber through the first fluid addition chamber and the reaction chamber by capillary force and stops flowing at the sensing chamber having appreciably large outlets, and a buffer solution loaded via the second fluid inlet port is forced to flow by the action of an external pump, through the channel and the sensing chamber, and is reserved in the used reagent chamber.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described more fully in the following exemplary embodiments with reference to the accompanying drawings. To facilitate understanding, identical reference numerals have been used, where possible, to designate identical elements that are common to the figures. Description on examples of microfluidic devices for controlling flow and stoppage of a micro amount of fluid by combination of natural capillary force and externally applied pressure (force) by pumping will be followed by those on examples of microfluidic devices for controlling the flow rate of fluid through channel geometry changes or surface modifications.

EMBODIMENT 1

Figure 1A:
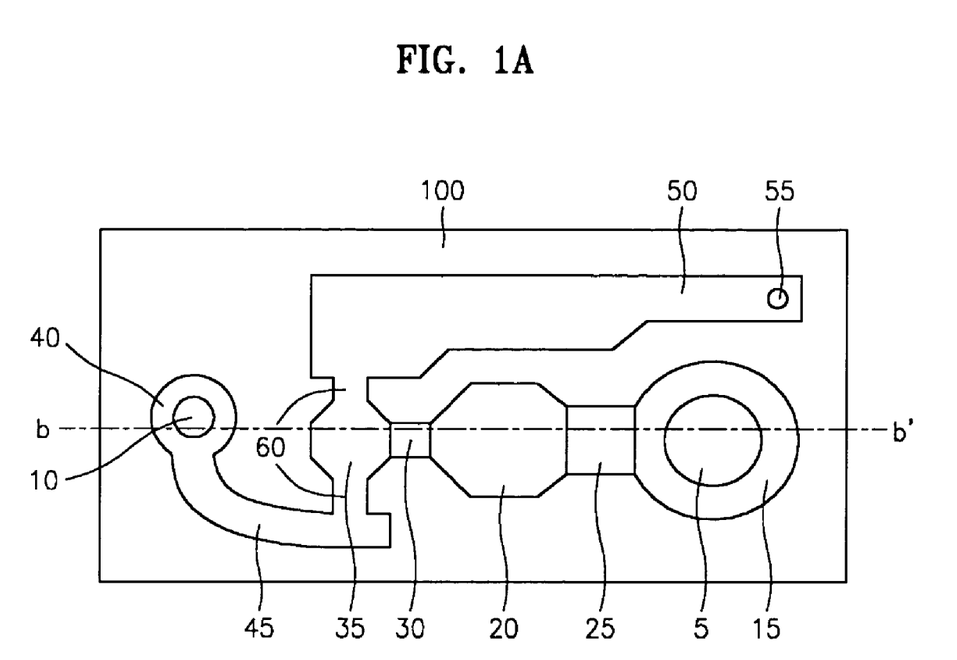
FIG. 1A is a bottom view of a channel substrate of a microfluidic device according to an embodiment of the present invention.
Figure 1B:
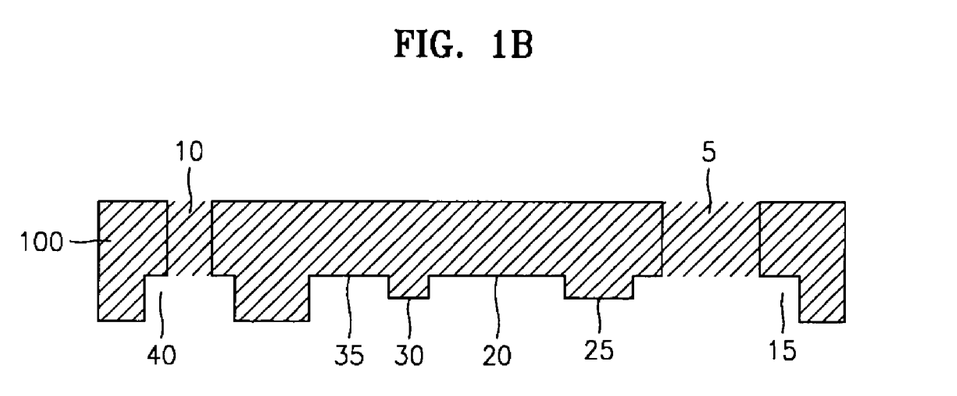
FIG. 1B is a sectional view taken along line b-b' of FIG. 1A.

FIG. 1A is a bottom view of a channel substrate of a microfluidic device according to an embodiment of the present invention, and FIG. 1B is a sectional view taken along line b-b' of FIG. 1A.

Referring to FIGS. 1A and 1B, holes are formed in a channel substrate 100 as a first fluid inlet port 5 and a second fluid inlet port 10. A first fluid (i.e., a fluid sample) addition chamber 15 is formed at a side of the channel substrate 100. Contiguous with the first fluid addition chamber 15, a sample reaction barrier 25, a reaction chamber 20, a time gate 30, and a sensing chamber 35 are sequentially formed. A sample injected into the first fluid inlet port 5 is flowed through the first fluid addition chamber 15, the sample reaction barrier 25, the reaction chamber 20, and the time gate 30 into the sensing chamber 35 by capillary force.

The first fluid addition chamber 15 should be large enough to accommodate the sample injected through the first fluid inlet port 5 in an amount that is sufficient to reach the sensing chamber 35, in general, be twice the total volume of the sample reaction barrier 25, the reaction chamber 20, the time gate 30, and the sensing chamber 35. The sample reaction barrier 25 limits the size of the reaction chamber 20 and minimizes diffusion of the sample after reaction in the reaction chamber 20. Biological/chemical substances in powder, colloid, gel, or solid form may be previously immobilized on the reaction chamber 20 for reactions with the injected sample. Additional various surfactants may be further supplied into the reaction chamber 20 in order to facilitate reactions of the sample and the biological/chemical substances or to control the flow rate of the sample after reaction. The time gate 30 sharply drops the flow rate of the sample to ensure the sample and the biological/chemical substances, in the reaction chamber 20, a sufficient reaction time. The sample rapidly flowed through the previous regions of the device comes to flow slowly, over a period of about 2-10 minutes, at the time gate 30. The sample that has flowed up to the sensing chamber 35 through the time gate 30, naturally by capillary force, does not flow any more by that capillarity when reaching the sensing chamber 35 having appreciably large outlets 60.

A second fluid (i.e., a buffer solution) addition chamber 40, a channel 45, and a used reagent reservoir 50 are formed on the same plane as the above-described elements of the channel substrate 100. A buffer solution injected into the second fluid addition chamber 40 is forced to flow through the channel 45 and the sensing chamber 35 by an external apparatus, such as a pump, and reaches the used reagent reservoir 50. An air bent 55 may be additionally formed in the channel substrate 10 to promote the transfer of the used reagent.

Suitable materials for the channel substrate 100 include, but are not limited to, various kinds of polymers, such as polymethylmethacrylate (PMMA), polycarbonate (PC), cycloolefin copolymer (COC), polydimethylsiloxane (PDMS), polyamide (PA), polyethylene (PE), polypropylene (PP), polyphenylene ether (PPE), polystyrene (PS), polyoxymethylene (POM), polyetheretherketone (PEEK), polytetrafluoroethylene (PTFE), polyvinylchloride (PVC), polyvinylidene fluoride (PVDF), polybutyleneterephthalate (PBT), fluorinated ethylenepropylene (FEP), and perfluoralkoxyalkane (PFA); various kinds of metals, such as aluminum, copper, and iron; silicon; glass; a printed circuit board (PCB), etc, which may be used alone or in combination for a hybrid type. Suitable processing methods of the channel substrate 100 include, but are not limited to, hot embossing; injection molding; casting; stereolithography; laser ablation; rapid prototyping; silk screen; traditional machining processes, such as numerical control machining; and semiconductor manufacturing processes, such as deposition and etching. Injection molding is a technique of simultaneously forming a number of articles having the same shape using a mold insert, in which a thermoplastic resin, such as PMMA, PVC, or ABS, is generally used. Hot embossing, which is also called compression molding, is a technique of forming a number of plastic articles at the same time using a molding tool, in which various kinds of thermoplastic resins, such as PMMA, POM, PC, PVDE, PSU, etc., are generally used.

Figure 2:
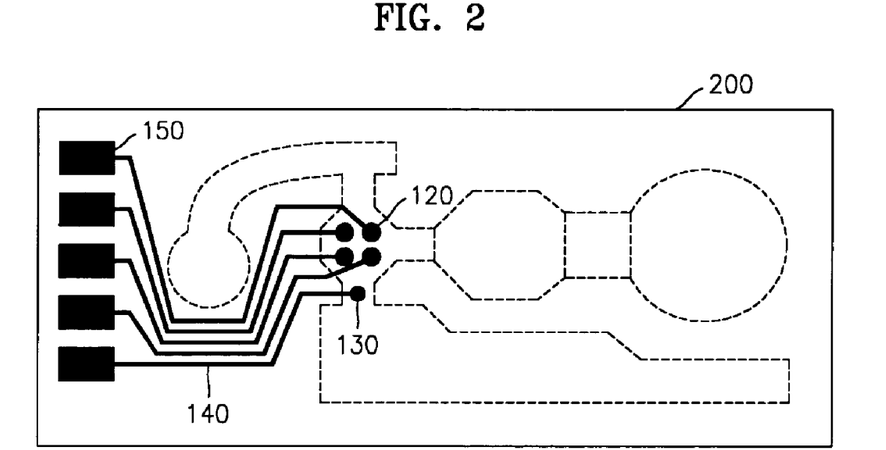
FIG. 2 is a plan view of an embodiment of a sensing substrate of a microfluidic device according to the present invention.

FIG. 2 is a plan view of an embodiment of a sensing substrate of a microfluidic device according to the present invention. Referring to FIG. 2, sensing electrodes 120 and 130, electrode interconnects 140, and electrode pads 150 are formed on the top surface of the sensing substrate 200. The above-described materials and methods for the channel substrate 100 may be commonly applied to the sensing substrate 200. Biological/chemical substances (for example, proteins, such as antigens and antibodies, and DNA) or a self-assembled monolayer, which is generally formed through surface treatment, may be immobilized on the sensing electrodes 120 and 130, selectively depending on the application purpose and a target substance to be analyzed. In addition, various chemical substances, including surfactants, may be previously attached to the sensing electrodes 120 and 130 if needed. The electrode interconnects 140 transmit an electrical signal between the sensing electrodes 120 and 130 and the electrode pads 150. The electrode pads 150 transmits an incoming or outgoing electrical signal in connection with an external device. In FIG. 2, for the convenience of understanding, channels and chambers formed in the channel substrate 100 of FIG. 1A, which become complete when the channel substrate 100 is bound to the sensing substrate 200, are indicated by the dashed lines on the surface of the sensing substrate 200.

Figure 3:
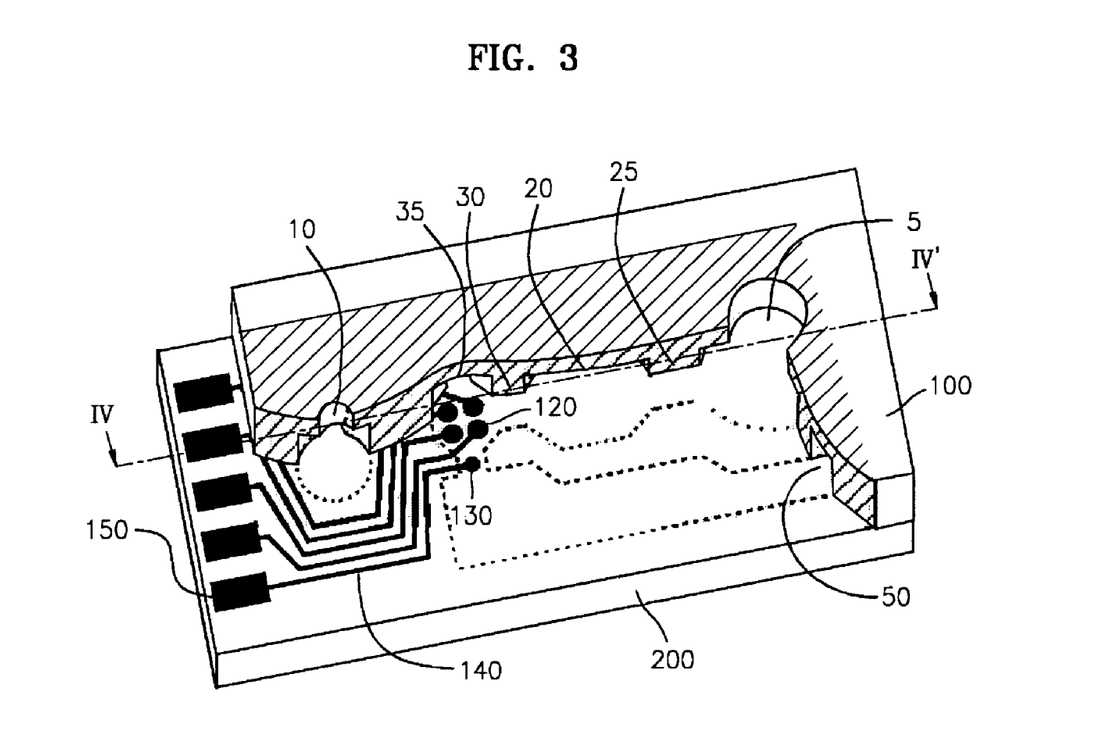
FIG. 3 illustrates a structure of a microfluidic device according to the present invention assembled from the channel substrate of FIG. 1A and the sensing substrate of FIG. 2.

FIG. 3 illustrates the structure of a microfluidic device according to the present invention assembled from the channel substrate 100 of FIG. 1A and the sensing substrate 200. Referring to FIG. 3, the channel substrate 100 of FIG. 1A is bound to the top surface of the sensing substrate 200, while the electrode pads 150 on the sensing substrate 200 are exposed.

Figure 4:
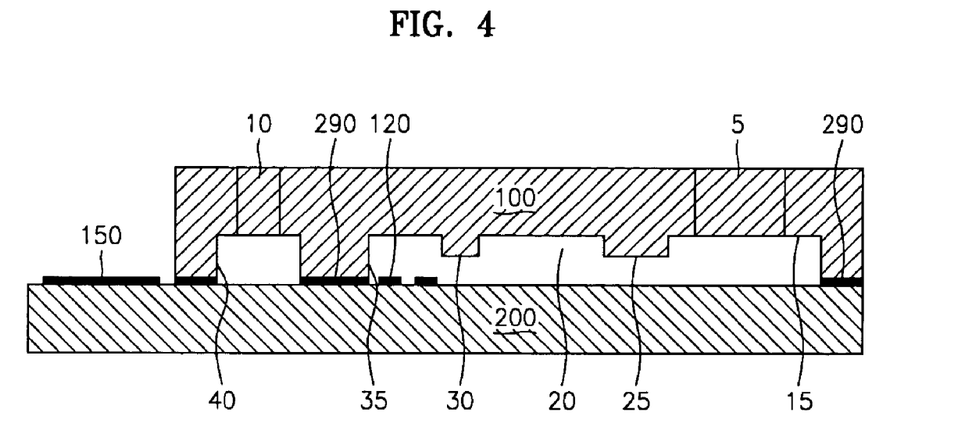
FIG. 4 is a sectional view of the microfluidic device of FIG. 3 taken along line IV-IV'.

FIG. 4 is a sectional view of the microfluidic device of FIG. 3 taken along line IV-IV'. Referring to FIG. 4, the channel substrate 100 and the sensing substrate 200 are combined together by an adhesive material 290. Any adhesive material, for example, in the form of liquid, powder, or a thin film, may be used for the adhesive material 290. In addition, when there is a need to bind the two substrates at room temperature or at a low temperature to prevent denaturation of the biological/chemical substances immobilized thereon, a pressure-sensitive adhesive, which is attached to a subject only by pressure, or an ultrasonic bonding method involving locally melting substrates for binding, using ultrasonic energy, may be used. An essential consideration when binding the channel substrate 100 and the sensing substrate 200 is the perfect binding at every channel and every chamber for an injected sample or buffer solution not to leak, bypass a channel, or flow into an improper chamber, through a small gap. In addition, an additional clip-type structure may be used to more tightly bind the channel substrate 100 and the sensing substrate 200.

In the microfluidic device according to the present invention described above, a sample injected via the first fluid inlet port 5 flows by capillary force along a predetermined channel to a site of destination. Biological/chemical substances may be previously immobilized on the sensing electrodes 120 and 130 so that the injected sample can be electrochemically detected through a reaction with the biological/chemical substances. After the biochemical reaction of the injected sample on the sensing electrodes 120 and 130, floating, unbound small particles or colloids or reaction products loosely bound to the sensing electrodes 120 and 130 need to be washed away, and the sample used needs to be exchanged with a buffer solution for electrochemical detection. The buffer solution is injected via the second fluid inlet port 10 and forced to flow by an external pump to push out the sample and exchange fluids. The reaction products can be effectively washed, and the sample used can be fully exchanged with a suitable buffer solution by applying an external pressure.

EMBODIMENT 2

Figure 5:
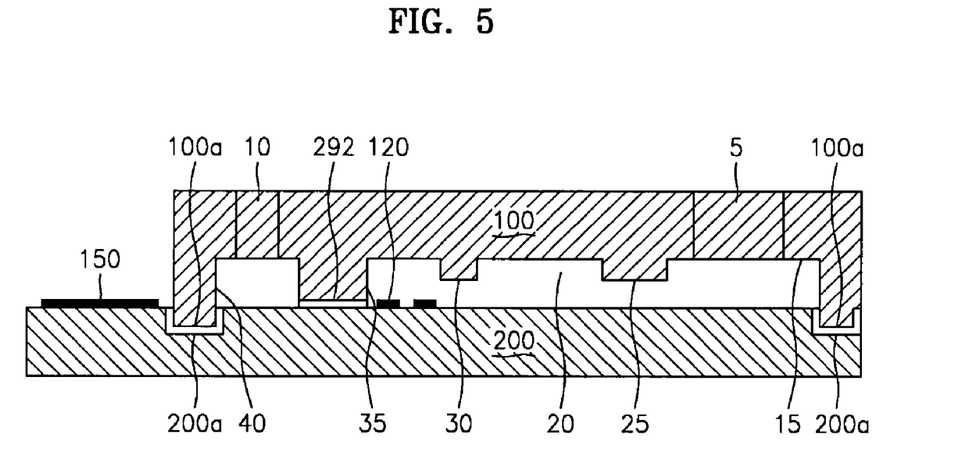
FIG. 5 is a sectional view of a microfluidic device according to another embodiment of the present invention.

FIG. 5 is a sectional view of a microfluidic device according to a second embodiment of the present invention. This second embodiment is similar to the first embodiment described above, with the exception of how the channel substrate 100 and the sensing substrate 200 are assembled.

The first embodiment is described as an example of applying the adhesive material 290 between the channel substrate 100 and the sensing substrate 200 to bind them together. In addition to the method of using the adhesive material 290, the channel substrate 100 and the sensing substrate 200 can be bound together by fitting projections formed on one of the substrates into grooves formed on the other.

In FIG. 5, projections 100a formed on the channel substrate 100 are fitted into the grooves 200a formed on the sensing substrate 200. When binding the channel substrate 100 and the sensing substrate 200 in this manner, an elastic polymer pad 292 may be additionally placed at contact sites of the two substrates to prevent a small gap.

EMBODIMENT 3

Figure 6:
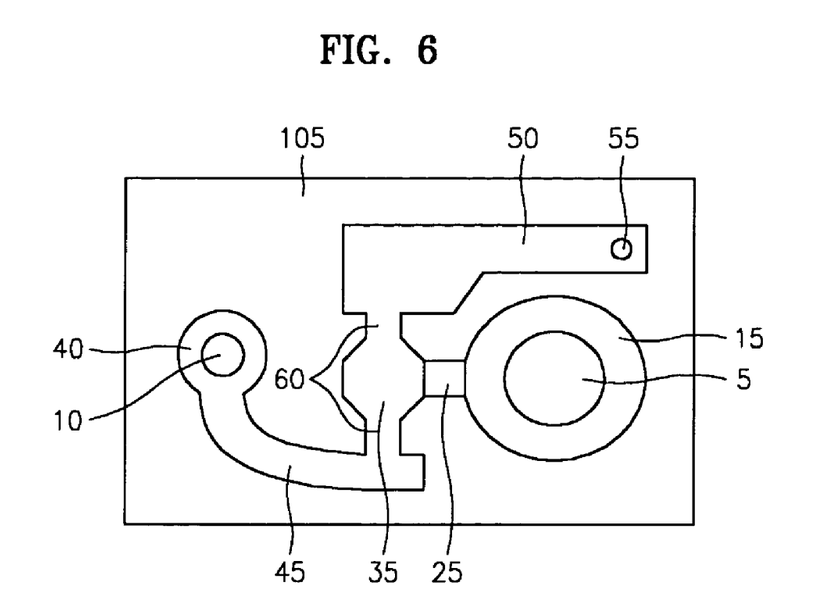
FIG. 6 is a plan view of a channel substrate of a microfluidic device according to still another embodiment of the present invention.

FIG. 6 is a plan view of a channel substrate of a microfluidic device according to a third embodiment of the present invention. This embodiment is a modification of the first embodiment for the channel substrate 100 of FIG. 1A.

Referring to FIG. 6, the reaction chamber 20 and the time gate 30 of FIG. 1A are eliminated in a channel substrate 105 so that the first fluid addition chamber 15 and the sample reaction barrier 25 are directly connected to the sensing chamber 35. Capillarity that induced natural fluid flow up to the sample reaction barrier 25 is not exerted any more when the fluid reaches the sensing chamber 35 having appreciably large outlets 60.

EMBODIMENT 4

Figure 7:
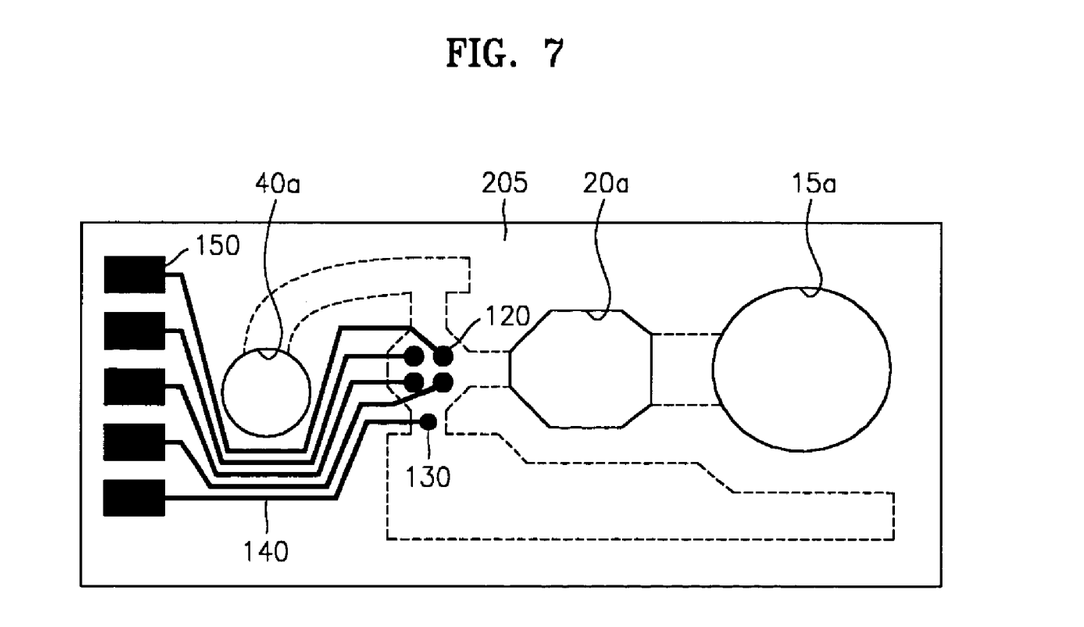
FIG. 7 is a plan view of a sensing substrate of a microfluidic device according to yet another embodiment of the present invention.

FIG. 7 is a plan view of a sensing substrate of a microfluidic device according to a fourth embodiment of the present invention. This embodiment is a modification of the first embodiment for the sensing substrate 200 of FIG. 2.

Referring to FIG. 7, an additional channel or chamber is formed in a second substrate 205. An additional channel or chamber formed in the second substrate 205 may be the same in shape and depth as that of the channel substrate 100 of FIG. 1A. A channel or chamber having a different shape and depth from that of FIG. 1A may be formed in a local region of the second substrate 205 if necessary. In this embodiment, recesses 15a, 20a, and 40a, which correspond to the first fluid addition chamber 15, the reaction chamber 20, and the second fluid addition chamber 40 of the channel substrate 100, respectively, are formed in the sensing substrate 205.

Figure 8:
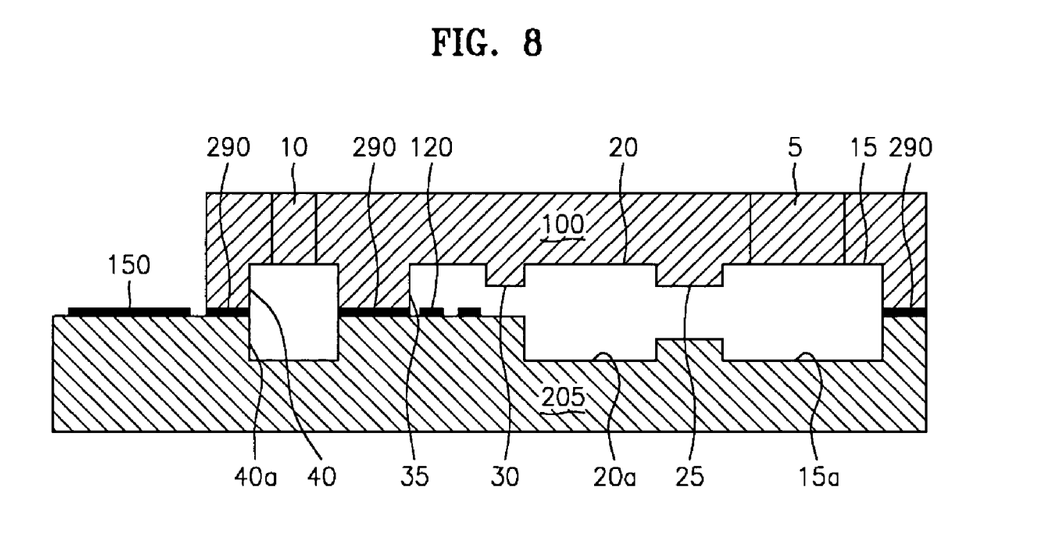
FIG. 8 is a sectional view of a microfluidic device assembled from the channel substrate of FIG. 1A and the sensing substrate of FIG. 7.

FIG. 8 is a sectional view of a microfluidic device assembled from the channel substrate 100 of FIG. 1A and the sensing substrate of FIG. 7. In this case, the channel substrate 100 and the sensing substrate 205 are bound together using the adhesive material 290, as in the first embodiment.

In the above-described embodiments, microfluidic devices of controlling fluid flow and flow stoppage of a micro amount of fluid by the combination of natural capillary flow and forced flow by pumping are described.

Furthermore, the present invention provides forming a sensing substrate and a channel substrate using heterogeneous materials, such as hydrophobic and hydrophilic materials. A sensing substrate and a channel substrate may be formed of homogeneous materials, such as hydrophobic or hydrophilic materials, but with different degrees of hydrophobicity or hydrophilicity. In either case, an additional hydrophobic or hydrophilic material pattern having opposite properties to the material composing the body of the substrate or with a different degree of hydrophilicity or hydrophobicity thereto may be additionally applied to a limited region of the sensing substrate or the channel substrate. This additional hydrophobic or hydrophilic material may be applied by deposition, coating, screen printing, or attachment, or may be formed as a protruding pattern. Hereinafter, examples of microfluidic devices for controlling the flow rate of fluid through channel geometry changes or surface modifications by selectively using hydrophobic or hydrophilic material as described above are described with reference to FIGS. 10A, 10B, 11 through 14, 15A, 15B, 16A and 16B. The terms "hydrophobicity" and "hydrophilicity" will be described first with reference to FIGS. 9A and 9B.

Figure 9A:
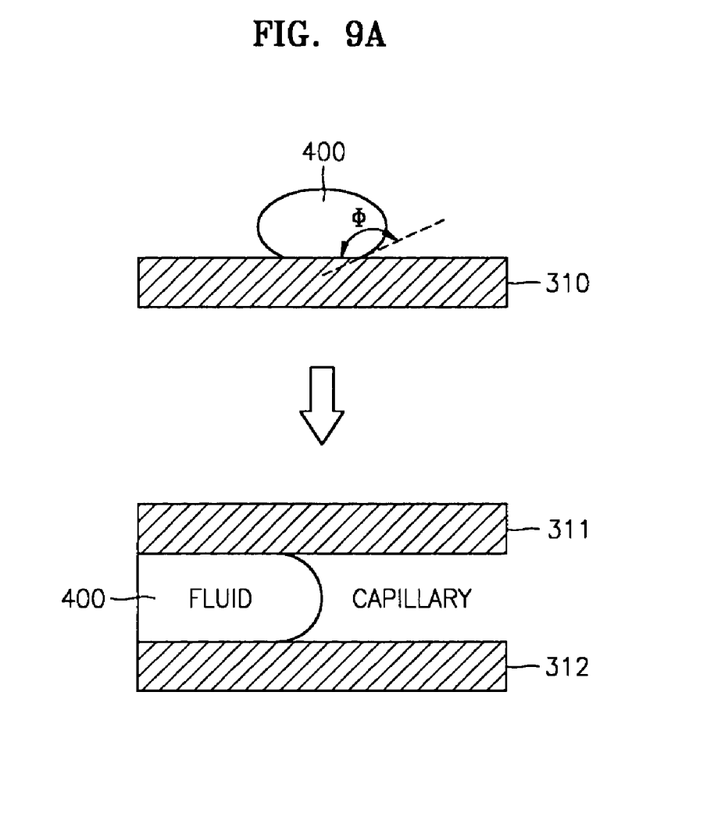
FIG. 9A is a sectional view illustrating the shape of a droplet of fluid on a flat substrate formed of a hydrophobic material and the shape of a flow front of fluid flowing along a hydrophobic capillary.

FIG. 9A is a sectional view illustrating the shape of a droplet of fluid on a flat substrate formed of a hydrophobic material and the shape of a flow front of fluid flowing along a hydrophobic capillary. As is apparent from the upper sectional view of FIG. 9A, a droplet of fluid has a contact angle that is greater than 90 degrees with respect to a hydrophobic material 310, which repels fluid. This property of materials giving fluid such a degree of contact angle is termed "hydrophobic". For this reason, in a narrow channel formed of hydrophobic materials 311 and 312, fluid 400 flows by capillary force, with a convex leading shape, as illustrated in the lower sectional view of FIG. 9A.

Figure 9B:
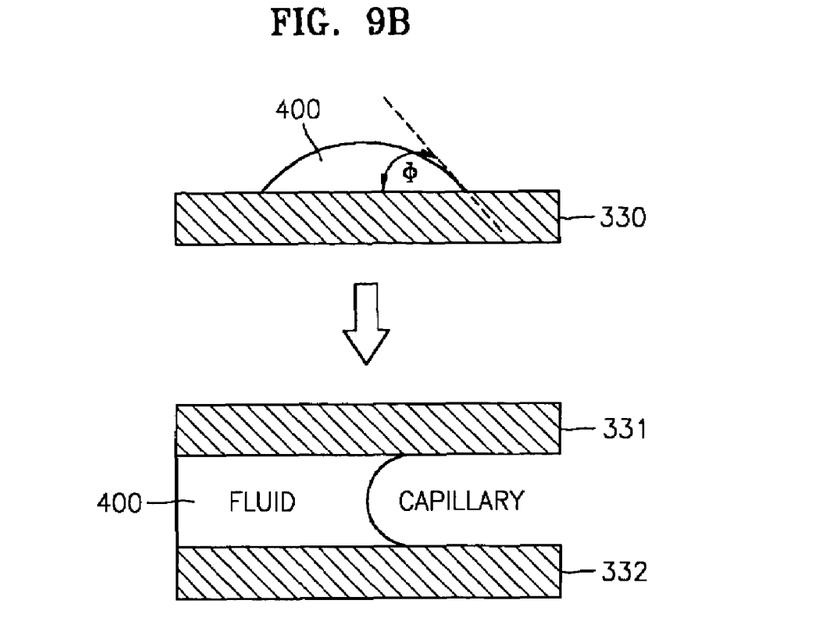
FIG. 9B is a sectional view illustrating the shape of a droplet of fluid on a flat substrate formed of a hydrophilic material and the shape of a flow front of fluid flowing along a hydrophilic capillary.

FIG. 9B is a sectional view illustrating the shape of a droplet of fluid on a flat substrate formed of a hydrophilic material and the shape of a flow front of fluid flowing along a hydrophilic capillary. As is apparent from the upper sectional view of FIG. 9B, a droplet of fluid has a contact angle that is smaller than 90 degrees with respect to a hydrophilic material 330, which attracts fluid. This property of materials giving fluid such a degree of contact angle is termed "hydrophilic". For this reason, in a narrow channel formed of hydrophilic materials 331 and 332, fluid 400 flows by capillary force, with a concave leading shape, as illustrated in the lower sectional view of FIG. 9B.

EMBODIMENT 5

Figure 10A:
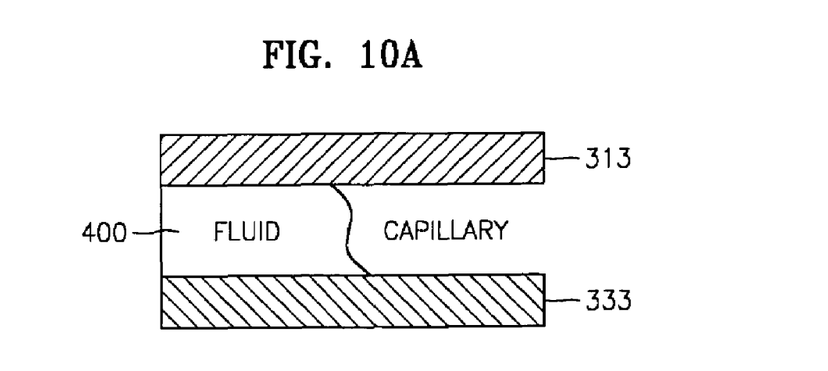
FIG. 10A is a sectional view illustrating the shape of a flow front of fluid flowing along a heterogeneous capillary formed of hydrophobic and hydrophilic materials.

FIG. 10A is a sectional view illustrating the shape of a flow front of fluid flowing along a heterogeneous capillary formed of hydrophobic and hydrophilic materials. This embodiment discloses a heterogeneous capillary formed by combining a hydrophobic material 313 and a hydrophilic material 333. The shape of a flow front of fluid 400 flowing along the heterogeneous capillary varies depending on the property of materials composing the capillary, as shown in FIG. 10A, due to the hydrophilic material 333 attracting the fluid 400 and the hydrophilic material 313 repelling the fluid 400.

Figure 10B:
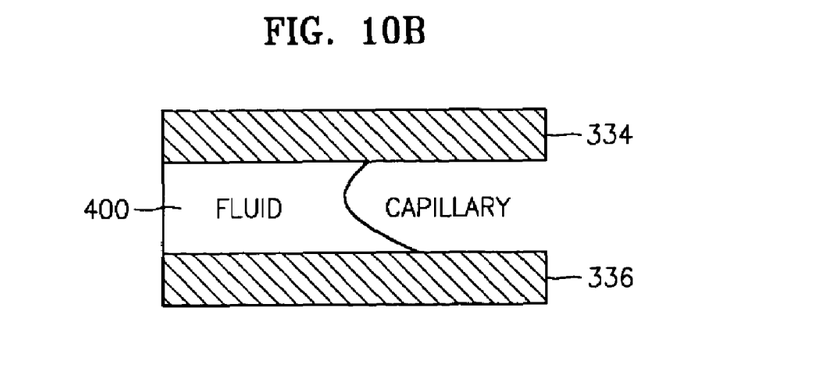
FIG. 10B is a sectional view illustrating the shape of a flow front of fluid flowing along a capillary formed of hydrophilic materials with different degrees of hydrophilicity.

FIG. 10B is a sectional view illustrating the shape of a flow front of fluid flowing along a capillary formed of hydrophilic materials with different degrees of hydrophilicity. This embodiment discloses a heterogeneous capillary formed by combining a low-hydrophilic material 334 and a high-hydrophilic material 336, which lead to different contact angles for the fluid.

For capillaries formed of heterogeneous hydrophilic and hydrophobic materials or hydrophilic materials with different degrees of hydrophilicity, as illustrated in FIGS. 10A and 10B, the overall flow rate of fluid can be controlled even for a given channel having a predetermined shape, by appropriately selecting materials for the capillary channel.

Therefore, in a microfluidic device according to the present invention, the overall flow rate in the microfluidic device can be controlled by appropriately selecting materials for the sensing substrate and the channel substrate, for example, using heterogeneous hydrophobic and hydrophilic materials for respective substrates or using homogeneous hydrophobic or hydrophilic materials but with different degrees of hydrophobicity or hydrophilicity, for respective substrates.

EMBODIMENT 6

Figure 11:
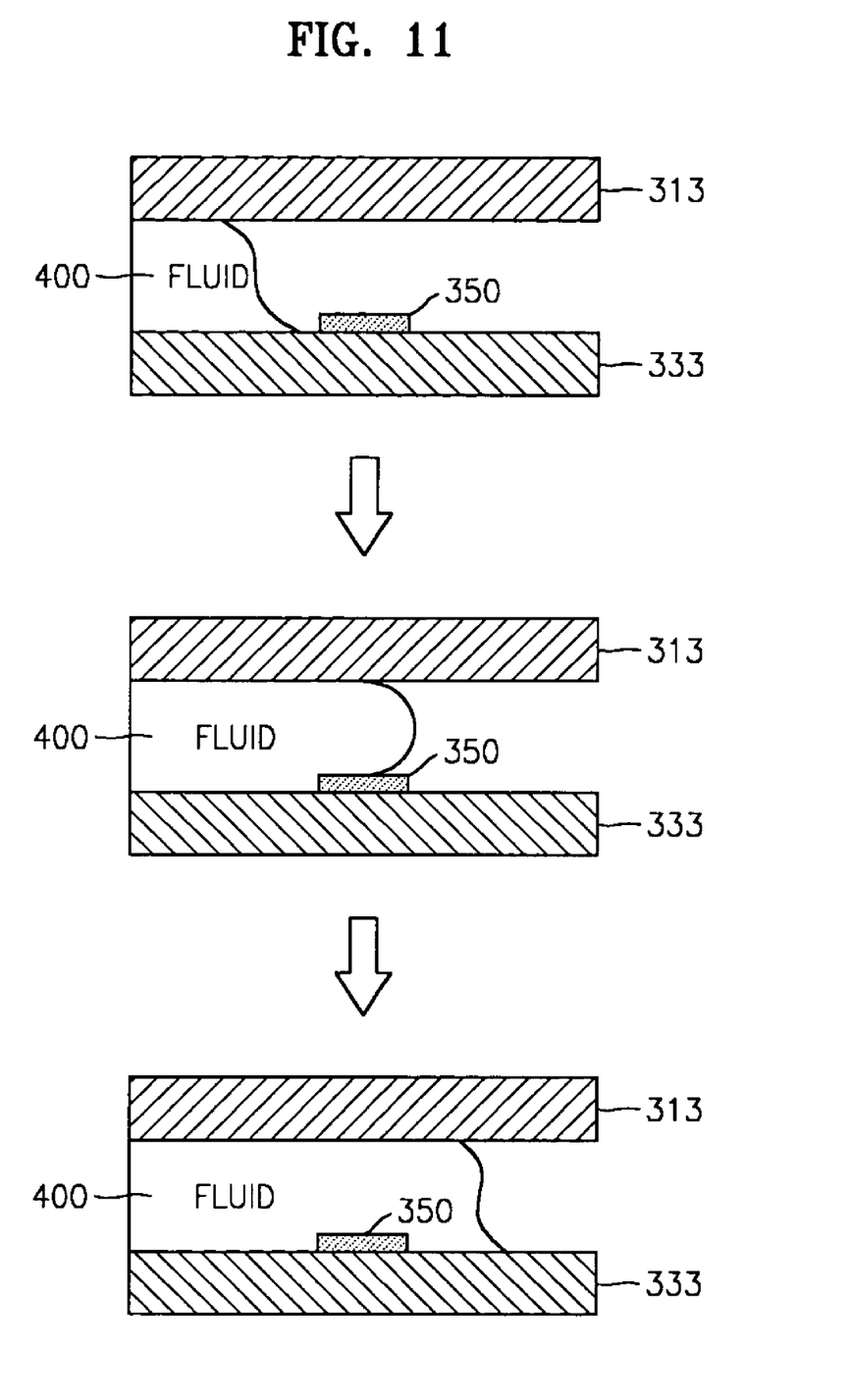
FIG. 11 is a sectional view illustrating sequential flow of fluid along a capillary formed of heterogeneous hydrophobic and hydrophilic materials and having an additional hydrophobic pattern on its hydrophilic inner wall, with variations in shape of a flow front of the fluid.
Figure 12:
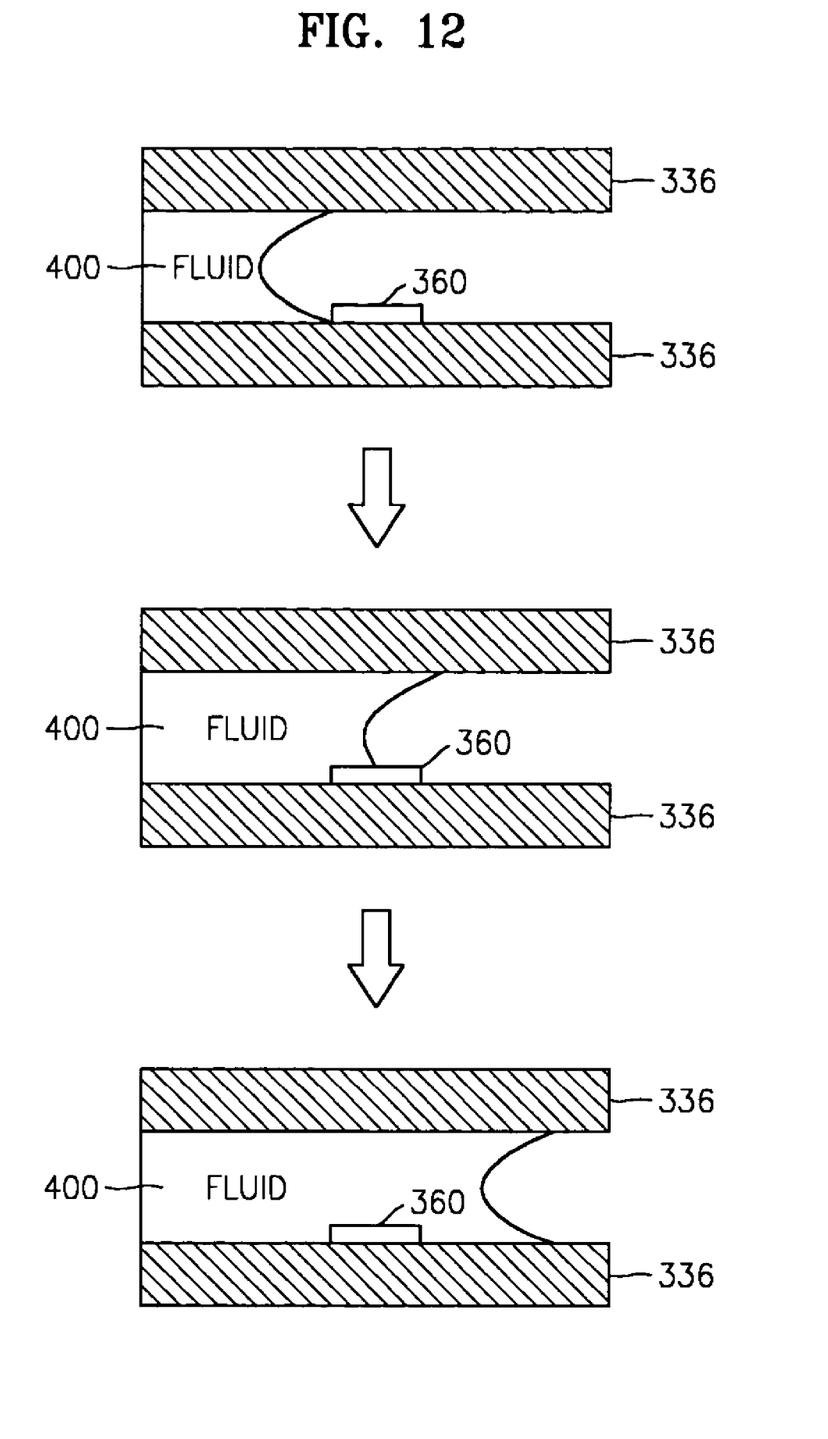
FIG. 12 is a sectional view illustrating sequential flow of fluid along a capillary formed of a homogeneous hydrophilic material, which has a higher degree of hydrophilicity, and having an additional hydrophilic pattern with a lower degree of hydrophilicity, with variations in shape of a flow front of the fluid.
Figure 13:
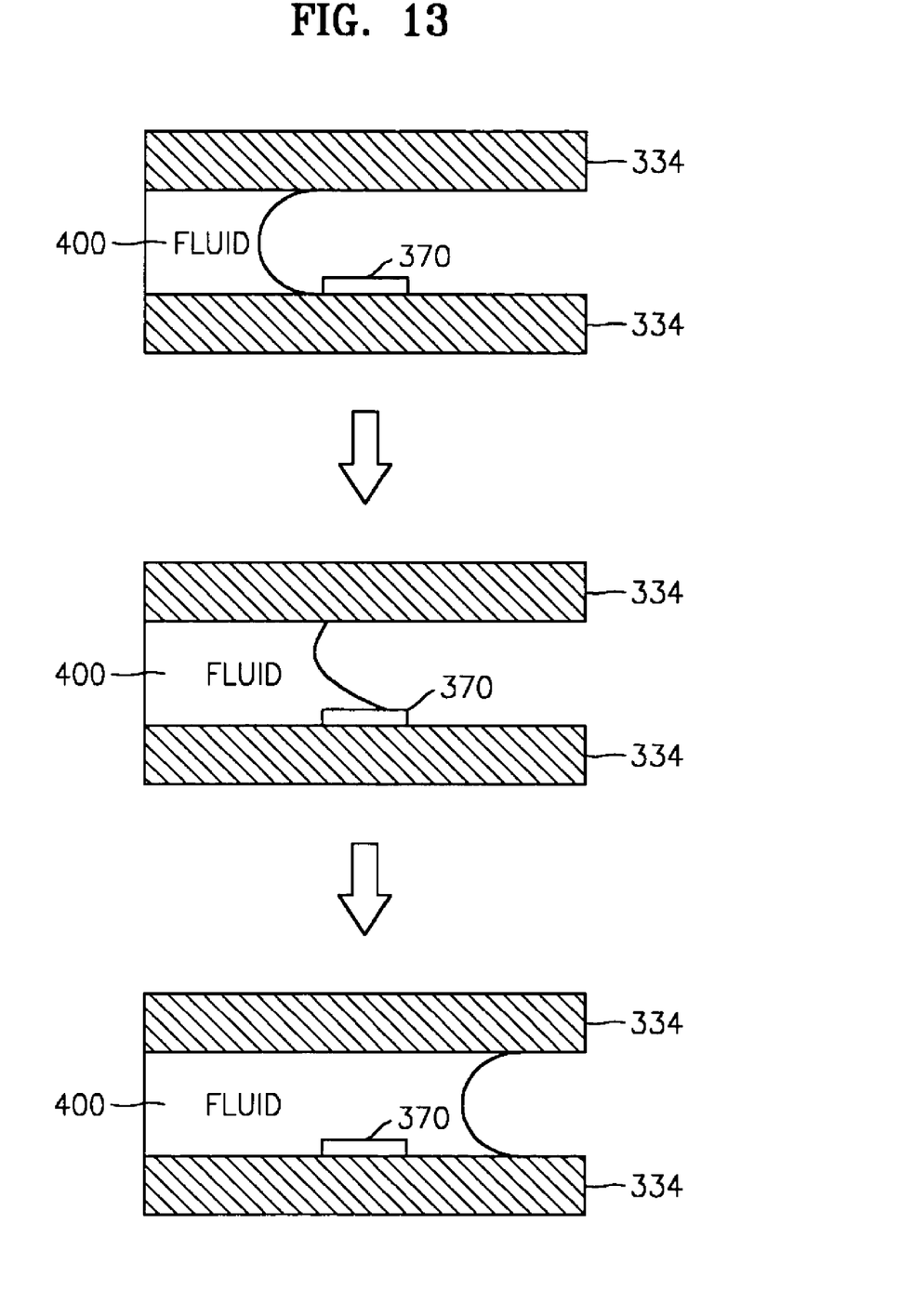
FIG. 13 is a sectional view illustrating sequential flow of fluid along a capillary formed of a homogeneous hydrophilic material, which has a lower degree of hydrophilicity, and having an additional hydrophilic pattern with a higher degree of hydrophilicity, with variations in shape of a flow front of the fluid.

In a region on an inner wall of a capillary formed of a homogeneous material or heterogeneous materials, an additional thin film (pattern) with a degree of hydrophobicity or hydrophilicity different from the material composing the capillary may be formed, as illustrated in FIGS. 11, 12, and 13, by deposition, coating, screen printing, or attachment, to locally raise or drop the flow rate of fluid in the capillary.

FIG. 11 is a sectional view illustrating sequential flow of fluid along a capillary formed of heterogeneous hydrophobic and hydrophilic materials and having an additional hydrophobic pattern on its hydrophilic inner wall, with variations in shape of a flow front of the fluid. The capillary of FIG. 11 was manufactured by forming a hydrophobic pattern 350 on the inner wall of the hydrophilic material 333 of the capillary of FIG. 10A. By manufacturing a capillary in such a way as illustrated in FIG. 11, the flow rate of fluid can be locally controlled in a given channel having a predetermined shape.

FIG. 12 is a sectional view illustrating sequential flow of fluid along a capillary formed of a homogeneous hydrophilic material, which has a higher degree of hydrophilicity, and having an additional hydrophilic pattern with a lower degree of hydrophilicity, with variations in shape of a flow front of the fluid. The capillary of FIG. 12 was manufactured by forming a lower-hydrophilic pattern 360 on a region of an inner wall of a homogenous capillary formed of the higher-hydrophilic material 336 of FIG. 10B. By manufacturing a capillary in such a way as illustrated in FIG. 12, the flow rate of fluid can be locally controlled in a given channel having a predetermined shape.

FIG. 13 is a sectional view illustrating sequential flow of fluid along a capillary formed of a homogeneous hydrophilic material, which has a lower degree of hydrophilicity, and having an additional hydrophilic pattern with a higher degree of hydrophilicity, with variations in shape of a flow front of the fluid. The capillary of FIG. 13 was manufactured by forming a higher-hydrophilic pattern 370 on a region of an inner wall of a homogenous capillary formed of the lower-hydrophilic material 334 of FIG. 10B. By manufacturing a capillary in such a way as illustrated in FIG. 13, the flow rate of fluid can be locally controlled in a given channel having a predetermined shape.

Figure 14:
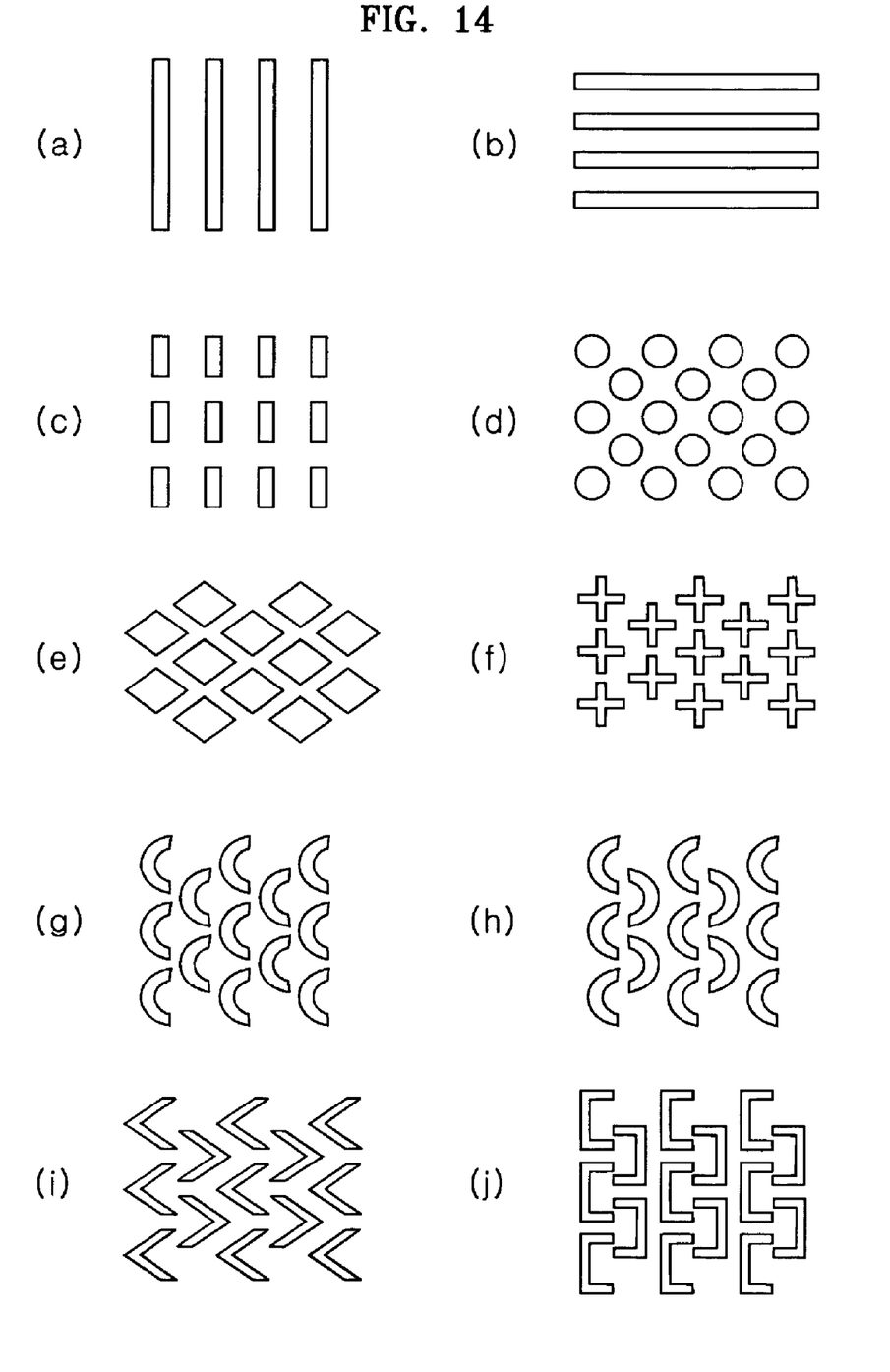
FIG. 14 illustrates various examples of hydrophobic or hydrophilic patterns, which can be applied to a channel, a chamber, or a time delay to control the flow front of fluid to be uniform or to raise or drop flow rate.

FIG. 14 illustrates various examples of hydrophobic or hydrophilic patterns with different degrees of hydrophobicity or hydrophilicity, which can be applied to an inner surface of such capillaries illustrated in FIGS. 11, 12, and 13. As illustrated in FIG. 14, hydrophobic or hydrophilic patterns for capillaries may be formed as stripes or geometrical figures. The flow rate of fluid in a capillary can be controlled by varying pattern size or pattern spacing or by combining patterns having different shapes. In addition, the shape of a flow front of fluid can be controlled to be consistent while flowing throughout a capillary, to prevent the generation of a small air bubble due to a local difference in flow rate. This idea of using an additional pattern may be applied to the time gate 20 of the channel substrate 100 or a corresponding time gate of the channel substrate 100 in order to markedly drop the flow rate at the time gate.

As described above, a sensing substrate and a channel substrate for a microfluidic device according to the present invention may be formed of heterogeneous hydrophobic and hydrophilic materials or may be formed of homogeneous hydrophobic or hydrophilic materials but with different degrees of hydrophobicity or hydrophilicity. In addition, a hydrophobic or hydrophilic pattern having an opposite property to the material composing the substrate or having a different degree of hydrophobicity or hydrophilicity from the material composing the substrate may be additionally formed on a region of the inner wall of the capillary by deposition, coating, screen printing, or attachment, to locally raise or drop the flow rate of fluid in the capillary.

EXAMPLE 7

Figure 15A:
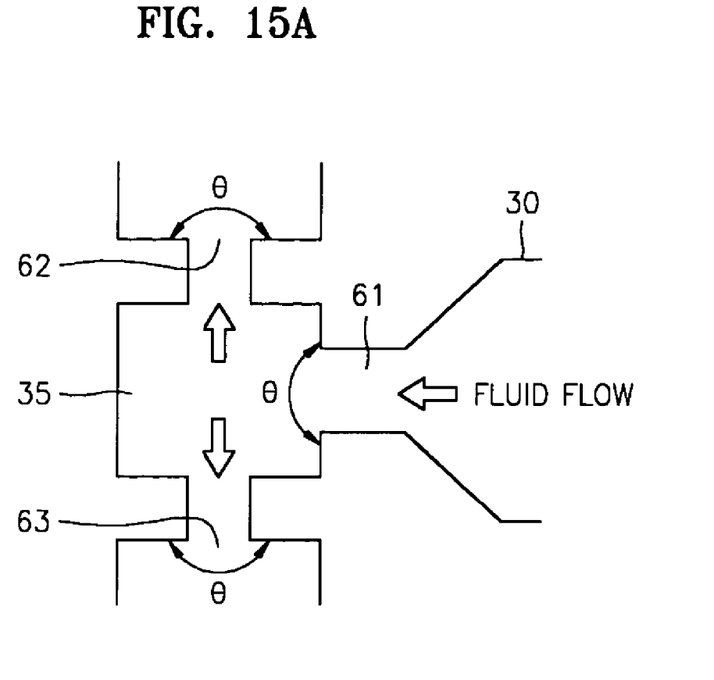
FIG. 15A illustrates flow stopping regions, which have a flow outlet much greater than a flow inlet to stop fluid flow through a sudden pressure drop.
Figure 15B:
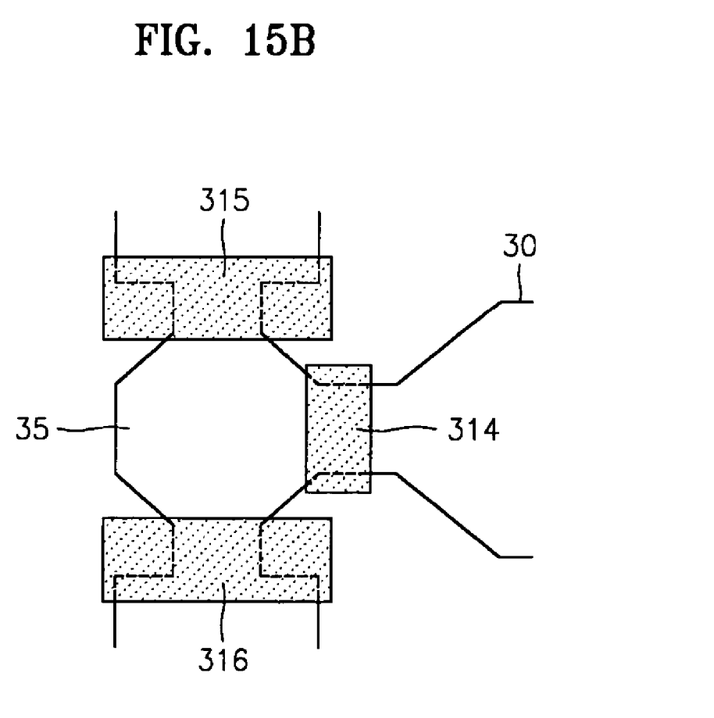
FIG. 15B illustrates the flow stopping regions of FIG. 15A with additional hydrophobic patches.

FIG. 15A illustrates flow stopping regions, which have a flow outlet much greater than a flow inlet to stop fluid flow through a sudden pressure drop. FIG. 15B illustrates the flow stopping regions of FIG. 15A with additional hydrophobic patches. As illustrated in FIGS. 15A and 15B, fluid flow can be stopped by forming such flow stopping regions 61, 62, and 63, which have a flow outlet much greater than a flow inlet, or by additionally attaching hydrophobic patches 314, 315, and 316 to flow stopping regions having a flow outlet much greater than a flow inlet.

Figure 16A:
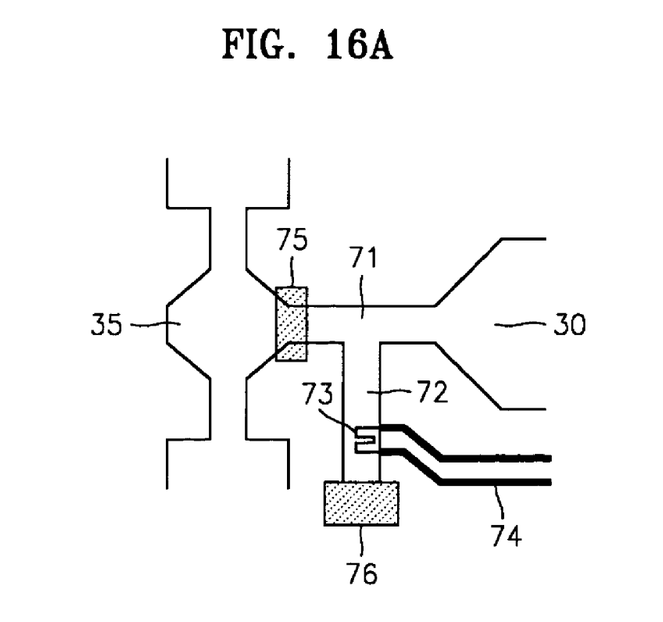
FIGS. 16A and 16B are plan views of microfluidic devices further including a sub-channel branching off from a main channel and a micro heater in the sub-channel to flow stationary fluid by heat generated by the micro heater and due to heat-induced bubble generation or to raise the flow rate of fluid.
Figure 16B:
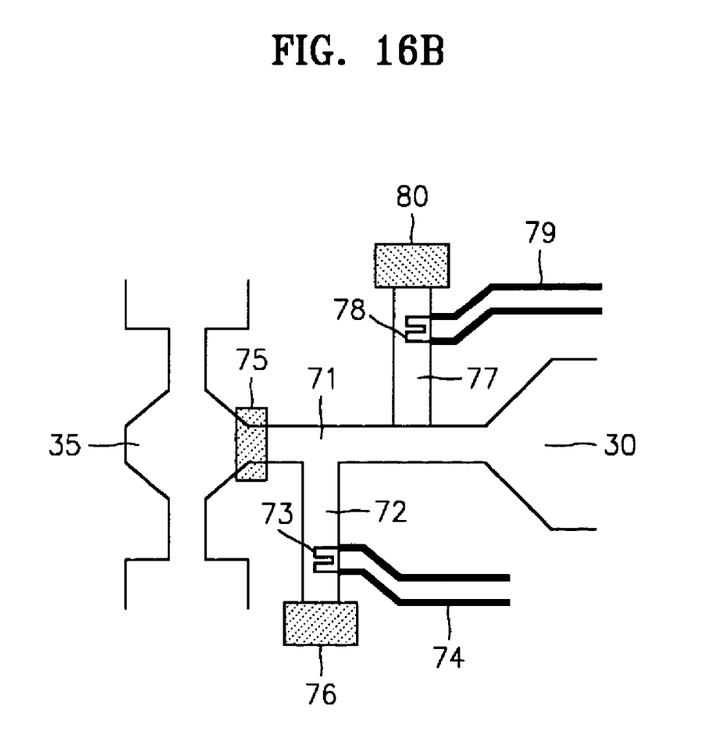

FIGS. 16A and 16B illustrate the mechanisms of controlling fluid flow, flow stoppage, and flow rate in microfluidic devices according to the present invention. Referring to FIGS. 16A and 16B, a reaction chamber 30 and a sensing chamber 35 are connected via a main channel 71, and sub-channels 72 and/or 77 branch off from the main channel 71. Micro heaters 73 and 78 connected to electrical wires 74 and 79 are installed in the sub-channels 72 and 77, respectively. Also, flow stopping regions 75, 76, and 80 appear. As the micro heaters 73 and 78 installed in the sub-channels 72 and 77, respectively, which branch off from the main channel 71, generate heat and bubbles, stationary fluid begins to flow again or the flow rate of fluid increases.

Referring to FIG. 16A, a sample that flowed through the reaction chamber 30 passes the main channel 71 and the sub-channel 72. The sample that enters the main channel 71 stops flowing at its flow stopping region 75. The sample that enters the sub-channel 72 stops flowing at its flow stopping region 76. As a current is applied through the electrical wires 74, in a state where the main channel 71 and the sub-channel 72 are filled with the sample, to heat the micro heater 73, bubbles are generated by heat and spontaneously expand to push the sample in the main channel 71 and the sub-channel 72 by pressure. The stationary sample in the flow stopping region 75 of the main channel 71 flows forth through the flow stopping region 75 by that pressure. The installation of the micro heater 73 in the sub-channel reduces a temperature deviation from the sample flowing along the main channel 71.

FIG. 16A illustrates an example of a microfluidic device including two sub-channels 72 and 77 and two micro heaters 73 and 78. This structure of FIG. 16A allows sequential generation of bubbles and further increases local hydraulic pressure.

As described above, microfluidic devices according to the present invention can control fluid flow and flow stoppage by combination of natural capillary force and external force applied by a pump and can control the flow rate of fluid through channel geometry changes or surface modifications. Therefore, such microfluidic devices according to the present invention can be applied to various bioassay devices, including protein chips, DNA chips, drug injectors, and micro biological/chemical reactors, which require accurate and precised flow controls.

Unlike conventional optical microfluidic devices which require only washing away an excess sample but not buffer exchange, a microfluidic device according to the present invention includes at least two fluid inlet ports, for example, one for sample injection and another for buffer loading, so that a sample injected via one fluid inlet port flows along a predetermined channel up to a site of designation by capillary force, and a buffer solution loaded via another fluid inlet port is forced to flow by external force to push out the sample that stays at a site. In a microfluidic device according to the present invention, biological/chemical substances may be previously immobilized on its sensing electrodes to electrochemically detect the reaction product between a sample and the biological/chemical substances. A buffer solution can be forced to flow by applying an external force using, for example, a pump, to wash the reaction product and exchange the reagent used.

Microfluidic devices according to the present invention are of a passive type, which does not require a dynamic device, such as an actuator, so that the power consumed by the microfluidic device and the manufacturing costs thereof are lowered, while raising yield and hardly causing problems.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microfluidic device comprising:
   a sensing substrate bound to a channel substrate,
   the sensing substrate including a sensing electrode, an electrode interconnect and an electrode pad,
   the channel substrate including a first fluid inlet port at a side of the channel substrate, a first fluid addition chamber around the first fluid inlet port, a sample reaction barrier connecting a sensing chamber with the first fluid addition chamber, and a second fluid inlet port at the other side of the channel substrate, a second fluid addition chamber around the second fluid inlet port, a channel connecting the second fluid addition chamber and the sensing chamber, and a used reagent reservoir connected to the sensing chamber;
   a first fluid comprising a sample for loading into the sensing chamber via the first fluid inlet port and a second fluid comprising a buffer solution for loading into the sensing chamber via the second fluid inlet port;
   an external pump for forcing fluid flow from the second fluid inlet port to the sensing chamber; and
   wherein the channel substrate is dimensioned such that a sample loaded via the first fluid inlet port flows into the sensing chamber through the first fluid addition chamber solely by capillary force, the sensing chamber having outlets which are larger than an inlet of the sensing chamber such that the capillary force diminishes at the sensing chamber outlets, and a buffer solution loaded via the second fluid inlet port flows by the action of the external pump through the channel and the sensing chamber, for washing reacted products, and is reserved in the used reagent reservoir.

2. The microfluidic device of claim 1, further comprising a reaction chamber and a time delay between the reaction barrier and the sensing chamber.

3. The microfluidic device of claim 1, wherein the sensing substrate further comprises recesses to correspond to the multiple fluid inlet ports, the chamber, or the channel.

4. The microfluidic device of claim 2, wherein the sensing substrate further comprises recesses to correspond to the multiple fluid inlet ports, the chamber, or the channel.

5. The microfluidic device of claim 1, wherein one of the sensing substrate and the channel substrate is formed of a hydrophobic material and the other is formed on a hydrophilic material.

6. The microfluidic device of claim 5, wherein a hydrophobic or hydrophilic material is applied to a local region on the inner surface of the sensing substrate or the channel substrate, with a different degree of hydrophobicity or hydrophilicity with respect to the material composing the corresponding substrate.

7. The microfluidic device of claim 1, wherein both of the sensing substrate and the channel substrate are formed of a hydrophobic or hydrophilic material with different degrees of hydrophobicity or hydrophilicity.

8. The microfluidic device of claim 7, wherein a hydrophobic or hydrophilic material is applied to a local region on the inner surface of the sensing substrate or the channel substrate, with a different degree of hydrophobicity or hydrophilicity with respect to the material composing the corresponding substrate.

9. The microfluidic device of claim 1, wherein the channel comprises a main channel and a sub-channel branching off from the main channel, and a micro heater is additionally installed in the sub-channel.

10. The microfluidic device of claim 1, wherein the channel substrate and the sensing substrate are bound together using an adhesive material, are bound using an additional clip-type structure, or are bound by fitting projections formed on one of the channel substrate and the sensing substrate into grooves formed on the other.

* * * * *